Dec. 6, 1927.
A. J. GREER
1,652,125
LAWN MOWER
Filed April 15, 1926
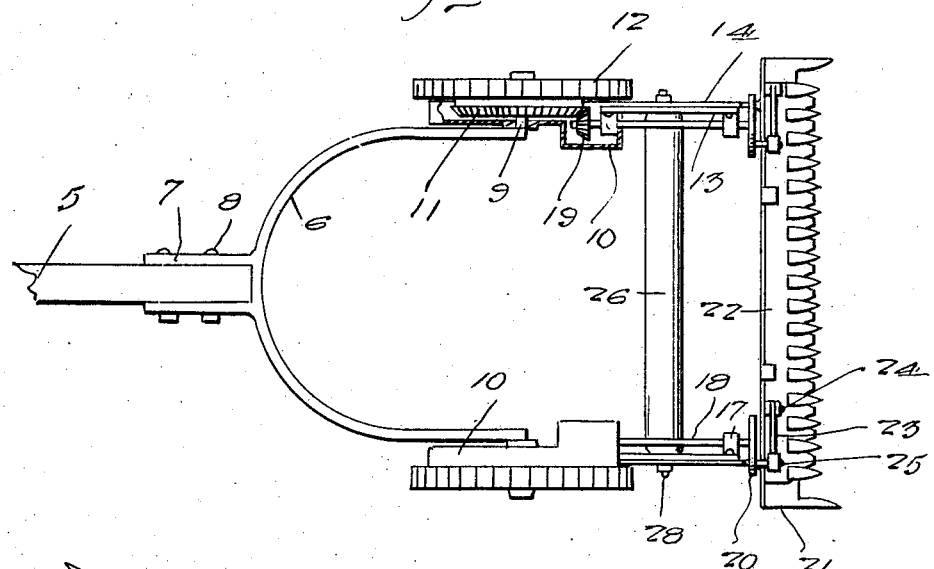
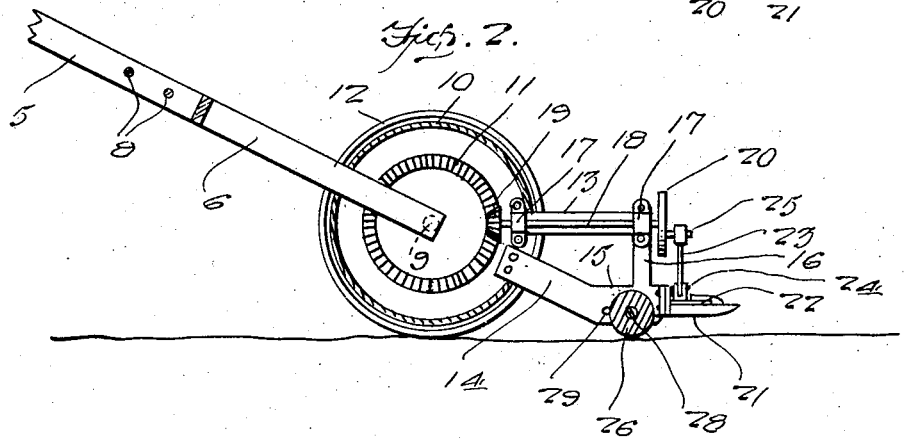
Inventor
A. J. Greer
By Clarence A. O'Brien
Attorney Patented Dec. 6, 1927.

1,652,125

UNITED STATES PATENT OFFICE.

ANDREW J. GREER, OF GALLATIN, TENNESSEE.

LAWN MOWER.

Application filed April 15, 1926. Serial No. 102,219.

The present invention relates to a lawn mower and has for its prime object to provide a structure possessing superior compactness and convenience and particularly one which provides clearance between the drive wheels thereof.

Another very important object of the invention resides in the provision of a device of this nature with an exceedingly simple construction, one which is thoroughly reliable and efficient in operation, inexpensive to manufacture, strong and durable, not likely to easily become out of order, readily assembled and disassembled, one in which the parts are very accessible, and one which is otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a top plan view, certain parts being broken away, of the lawn mower embodying the features of my invention, and Fig. 2 is a longitudinal vertical section therethrough.

Referring to the drawing in detail, it will be seen that 5 designates the usual elongated handle. I mount on the end of this handle a U-shaped frame or yoke 6 having at its intermediate or bight portion, a pair of spaced ears 7 for receiving therebetween the end of the handle 5. The ears 7 are fastened to the handle 5 by bolts 8 or other suitable fastening elements. The ends of the U-shaped frame or yoke 6 are offset outwardly to form stub axles 9. A casing 10 is mounted on each stub axle 9 and houses a beveled gear 11 rotatable on said axle 9. Drive wheels 12 are rotatable on the stub axle 9 and are fixed or formed a part of the beveled gears 11.

A pair of arms 13 project forwardly from the casings 10 to be normally disposed substantially horizontal. A second pair of arms 14 extend forwardly from the casings 10 and are inclined downwardly, terminating in horizontal portions 15 having posts 16 rising therefrom and engaged with the forward ends of the arms 13. Thus the arms 13 and 14 and the posts 16 form forward side frames. A pair of bearings 17 are mounted on each arm 13, one adjacent each end thereof for rotatably receiving a shaft 18 having a beveled gear or pinion 19 at one end meshing with the corresponding gear 11 and an eccentric 20 at the other end thereof.

A cutter bar 21 is attached to the forward ends of the side frames, that is at the forward ends of the extensions 15 of arms 14 and has mounted therein the cutter 22 for rectilinear movement transversely of the lawn mower. Pitman rods 23 are pivotally engaged with the cutter 22 as at 24 and with the eccentric 20 as at 25.

It will thus be seen that when the mower is pushed by an operator, the wheels 12 impart rotary motion to the shafts 18 through the intermediacy of gears 11 and pinions 19, thereby causing rotation of the disks 20 for imparting transverse rectilinear movement to the cutter 22 through the intermediacy of the pitmen 23. A wooden roller 26 on shaft 28 is mounted between the side frames, and for this purpose, I preferably provide slots 29 in the portions 15 for receiving the ends of the shaft 28.

It is thought that the construction, operation, utility, and advantages of this invention will now be apparent to those skilled in this art without a more detailed description thereof. Particular attention is directed to the compactness and convenience of the arrangement, it being noticed that there is considerable clearance provided between the wheels 12 as is desirable particularly in contrast to the conventional structure wherein an axle extends between the tractor or drive wheels. The present embodiment of the invention has been disclosed in detail, merely by way of example, since in actual practice, it attains the features of advantage enumerated as desirable in the statement of the invention and the above description.

Numerous changes in the details of construction, and in the combination and arrangement of parts may be resorted to without departing from the spirit or scope of the invention as hereinafter claimed or sacrificing any of its advantages.

Having thus described my invention, what I claim as new is:—

A lawn mower of the class described including, in combination, a U-shaped yoke having its ends terminating in outwardly disposed off-set stub axles, a pair of spaced parallel ears formed on the bight or intermediate portion of the yoke, a handle having one end disposed between the ears and fixed thereto, casings mounted on the stub axles, drive wheels rotatably mounted on the stub axles exteriorly of the casings, gears rotatably mounted on the axles, fixed to the drive wheels and disposed interiorly of the casings, arms fixed to the casings and projecting forwardly and horizontally, arms projecting from the casings depending forwardly and terminating in horizontal extensions, posts connecting the outer extremities of the first arms with the horizontal extensions, bearings mounted on the first arms, shafts journaled in said bearings and having pinions at their inner ends meshed with the gears, and eccentrics at their outer ends, a cutter bar mounted on the said horizontal extensions, a cutter mounted on the cutter bar for rectilinear movement therein transversely of the lawn mower, and pitmen engaged with the cutter and engaged with the eccentrics.

In testimony whereof I affix my signature.

ANDREW J. GREER.